(12) United States Patent
Xu

(10) Patent No.: US 11,902,982 B2
(45) Date of Patent: Feb. 13, 2024

(54) TRANSMISSION CHANNEL ASSIGNMENT APPARATUS AND METHOD FOR CONTROLLING A TRANSMISSION OVER A TRANSMISSION CHANNEL

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 148 days.

(21) Appl. No.: 17/329,707

(22) Filed: May 25, 2021

(65) Prior Publication Data

US 2021/0282131 A1  Sep. 9, 2021

Related U.S. Application Data

(63) Continuation of application No. 16/844,458, filed on Apr. 9, 2020, now Pat. No. 11,044,708, which is a continuation of application No. PCT/CN2019/073040, filed on Jan. 24, 2019.

(60) Provisional application No. 62/621,581, filed on Jan. 24, 2018.

(51) Int. Cl.
*H04W 72/21* (2023.01)
*H04L 1/1812* (2023.01)
*H04W 72/23* (2023.01)

(52) U.S. Cl.
CPC .......... *H04W 72/21* (2023.01); *H04L 1/1812* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2011/0299500 A1 | 12/2011 | Papasakellariou et al. | |
| 2016/0212649 A1* | 7/2016 | Chen | H04L 1/1896 |
| 2017/0195088 A1* | 7/2017 | Uchino | H04L 1/1861 |
| 2018/0302895 A1 | 10/2018 | Akkarakaran et al. | |
| 2019/0028162 A1* | 1/2019 | Lee | H04W 72/0413 |
| 2019/0199477 A1* | 6/2019 | Park | H04W 72/1268 |
| 2019/0215823 A1* | 7/2019 | Kim | H04L 1/18 |
| 2019/0230683 A1* | 7/2019 | Akkarakaran | H04L 5/0053 |

(Continued)

FOREIGN PATENT DOCUMENTS

| | | |
|---|---|---|
| CN | 102111886 A | 6/2011 |
| CN | 102122979 A | 7/2011 |

(Continued)

OTHER PUBLICATIONS

IPI, Examination Report for Indian Application No. 202017035214, dated Aug. 27, 2021. 6 pages with English translation.

(Continued)

*Primary Examiner* — Diane L Lo
(74) *Attorney, Agent, or Firm* — PERKINS COIE LLP

(57) ABSTRACT

A terminal, configured with configured grant resource is provided, wherein the terminal is adapted to transmit limited control information in the configured grant resource. A network device is provided, wherein the network device is adapted to configure a terminal to transmit limited control information in a configured grant resource.

16 Claims, 1 Drawing Sheet

(56) References Cited

U.S. PATENT DOCUMENTS

| | | | |
|---|---|---|---|
| 2019/0356446 A1 | 11/2019 | Kim et al. | |
| 2019/0364561 A1 | 11/2019 | Xiong et al. | |
| 2020/0045722 A1* | 2/2020 | Bae | H04W 72/1284 |
| 2020/0169958 A1* | 5/2020 | Lee | H04W 52/146 |
| 2020/0177351 A1* | 6/2020 | Chen Larsson | H04L 1/1664 |

FOREIGN PATENT DOCUMENTS

| | | |
|---|---|---|
| CN | 102315897 A | 1/2012 |
| CN | 102484869 A | 5/2012 |
| CN | 103053121 A | 4/2013 |
| CN | 105917608 A | 8/2016 |
| JP | 2017539124 A | 12/2017 |

OTHER PUBLICATIONS

KIPO, Notification of Reason for Refusal for Korean Application No. 10-2020-7015289, dated Jul. 8, 2021. 11 pages with English translation.

3GPP TS 38.212 V1.2.1 (Dec. 2017)—3rd Generation Partnership Project; Technical Specification Group Radio Access Network; NR; Multiplexing and channel coding (Release 15) (82 pages).

3GPP TS 38.212 V15.0.0 (Dec. 2017) (Technical Specification)—3rd Generation Partnership Project; Technical Specification Group Radio Access Network; NR; Multiplexing and channel coding (Release 15) (82 pages).

3GPP TS 38.213 V15.0.0 (Dec. 2017) (Technical Specification)—3rd Generation Partnership Project; Technical Specification Group Radio Access Network; NR; Physical layer procedures for control (Release 15) (56 pages).

3GPP TS 38.214 V15.0.0 (Dec. 2017) (Technical Specification)—3rd Generation Partnership Project; Technical Specification Group Radio Access Network; NR; Physical layer procedures for data (Release 15) (71 pages).

3GPP TS 38.214 V2.0.0 (Dec. 2017)—3rd Generation Partnership Project; Technical Specification Group Radio Access Network; NR; Physical layer procedures for data (Release 15) (71 pages).

3GPP TS 38.331 V1.0.0 (Dec. 2017)—3rd Generation Partnership Project Technical Specification Group Radio Access Network NR Radio Resource Control (RRC) Protocol specification (Release 15) (187 pages).

3GPP TS 38.331 V15.0.0 (Dec. 2017) (Technical Specification)—3rd Generation Partnership Project; Technical Specification Group Radio Access Network; NR; Radio Resource Control (RRC) protocol specification (Release 15) (188 pages).

3GPP TSG RAN WG 1 Ad Hoc Meeting—Vancouver, Canada, Jan. 22-26, 2018—R1-1800054—Huawei, HiSilicon, Discussion on UCI feedback for URLLC (13 pages).

3GPP TSG RAN WG1 Meeting #92-R1-1801302—Athens, Greece, Feb. 26-Mar. 2, 2018—MCC Support, Final Report of 3GPP TSG RAN WG1 #AH_1801 v1.0.0 (Vancouver, Canada, Jan. 22-26, 2018) (114 pages).

3GPP TSG RAN WG1 Meeting AH 1801—Vancouver, Canada, Jan. 22-26, 2018—R1-1801000—Qualcomm Incorporated, Remaining issues for multiplexing UCI on PUSCH (13 pages).

Corrected Notice of Allowability dated May 21, 2021 of U.S. Appl. No. 16/844,458, filed Apr. 9, 2020.

EPO, Examination Report for European Patent Application No. 19743858.3, dated May 10, 2021. 5 pages.

Examination Report dated Oct. 30, 2020 of Australian Patent Application No. 2019211700 (4 pages).

Final Office Action dated Sep. 25, 2020 of U.S. Appl. No. 16/844,458, filed Apr. 9, 2020.

Non-Final Office Action dated May 20, 2020 of U.S. Appl. No. 16/844,458, filed Apr. 9, 2020.

Notice of Allowance dated Dec. 23, 2020 of U.S. Appl. No. 16/844,458, filed Apr. 9, 2020.

Notice of Allowance dated Feb. 16, 2020 of U.S. Appl. No. 16/844,458, filed Apr. 9, 2020.

Supplementary European Search Report dated Oct. 26, 2020 of European Patent Application No. 19743858.3 (6 pages).

European Examination Report issued May 10, 2021 of European Patent Application No. 19 743 858.3 (5 pages).

Notice of Acceptance dated Jan. 20, 2021 of Australian Patent Application No. 2019211700 (3 pages).

International Search Report dated Apr. 26, 2019 of PCT/CN2019/073040 (2 pages).

Notification of Reason for Refusal for Korean Application No. 10-2020-7015289 dated Jan. 25, 2022. 4 pages with English translation.

Written Opinion for Singapore Application No. 11202004706T dated May 24, 2022. 7 pages.

First Office Action for Chinese Application No. 202010387904.X dated Aug. 18, 2022. 14 pages with English translation.

Research In Motion et al. "UCI Transmission in the Presence of UL-SCH Data" R1-103067; 3GPP TSG RAN WG1 Meeting #61; Montreal, Canada; May 10-14, 2010.

Notice of Reasons for Refusal for Japanese Application No. 2020-527005 dated Dec. 2, 2022. 6 pages with English translation.

Panasonic "Discussion on UCI multiplexing with different use cases" R1-1713352; 3GPP TSG RAN WG1 Meeting #90; Prague, Czechia; Aug. 21-25, 2017. 2 pages.

* cited by examiner

TRANSMISSION CHANNEL ASSIGNMENT APPARATUS AND METHOD FOR CONTROLLING A TRANSMISSION OVER A TRANSMISSION CHANNEL

CROSS-REFERENCE TO RELATED APPLICATIONS

The present application is a continuation application of U.S. patent application Ser. No. 16/844,458 filed on Apr. 9, 2020, which is a continuation of International PCT Application No. PCT/CN2019/073040 having an international filing date of Jan. 24, 2019, which claims priority to U.S. application No. 62/621,581, filed on Jan. 24, 2018. The present application claims priority and the benefit of the above-identified applications and the above-identified applications are incorporated by reference herein in their entirety.

FIELD OF INVENTION

The present disclosure relates to the technical field of communication networks. In particular, the present disclosure relates to a terminal or UE and to a network device.

PRIOR ART

A characteristic of 5G is the ability to support different devices and services with different performance requirements in terms of latency, reliability and throughput. Furthermore, URLLC traffic is supported with low latency e.g 1 ms, and high reliability. e.g. 99.999% as well as eMBB traffic with high throughput but relaxed latency and reliability requirements. In addition 5G is able to support data traffic models such as IP data traffic, non-IP data traffic, and short data bursts such as for example in Internet of Things based applications. In such applications sensors may send data packages ranging in size from a small status update to streaming video, or modem telephones such as smart phones may generate widely varying amounts of data. In contrast to 4G, the architecture of 5G is not only designed for large amounts of data and thus also supports short data bursts without the need for lengthy signaling procedures before and after sending a small amount of data. Cloud applications like cloud robotics may perform computation in the network rather than in a device and therefore may require low end-to-end latencies and high data rates.

Different devices may also have different mobility requirements. Sensors embedded in infrastructure may be stationary during their entire usable life. Other devices may be stationary during active periods, but nomadic between activations or other devices may be fully mobile.

The document 3GPP TS 38.212 V1.2.1 (2017-12) with the title "3rd Generation Partnership Project; Technical Specification Group Radio Access Network; NR; Multiplexing and channel coding (Release 15)" specifies the coding, multiplexing and mapping to physical channels for 5G NR (New Radio).

The document 3GPP TS 38.214 V2.0.0 (2017-12) with the title "3rd Generation Partnership Project; Technical Specification Group Radio Access Network; NR; Physical layer procedures for data (Release 15)" specifies and establishes the characteristics of the physicals layer procedures of data channels for 5G-NR. In chapter 5.2.3. this specification describes CSI (Channel State Information) reporting using PUSCH (Physical Uplink Shared Channel). CSI is part of UCI (Uplink Control Information).

The document 3GPP TS 38.331 V1.0.0 (2017-12) with the title "3rd Generation Partnership Project Technical Specification Group Radio Access Network NR Radio Resource Control (RRC) Protocol specification (Release 15) describes RRC (Radio Resource Control) information elements (IE)

SHORT DESCRIPTION OF INVENTION

It is an object of the present disclosure to provide for an efficient piggybacking, multiplexing or transmitting of UCI in PUSCH.

It is an open issue that UCI piggyback in configured grant resource. If the scheme in LTE (Long Term Evolution) that UCI can always be piggybacked in PUSCH is applied, the data reliability of configured grant resource, especially for URLLC (Ultra-Reliable Low-Latency Communications) data, cannot be guaranteed.

Piggybacking or transmitting of UCI is an open issue.

An UCI piggybacked in PUSCH can make data delivery unreliable.

It might be seen as a gist of the invention limiting the number of pieces of control information to be transmitted over a PUSCH by controlling the quantity of control information that is to be transmitted over the PUSCH. In this way the reliability of the transport of control information may be increased.

Thus, according to an aspect of the invention a rule or method of UCI piggyback in PUSCH may be provided, that prevents fixed patterns for UCI piggyback.

According to an aspect of the invention the terminal and/or the transmission of control information in a terminal may be flexibly adapted to PUSCH formats which vary and to multiple different services. In an example, the quantity of UCI transmitted in PUSCH may be different for URLLC and eMBB with different reliability requirements. This flexibility may prevent that always fixed patterns have to be employed which for example are fixed to the same size. In a flexible environment flexible patterns may be able to be adapted to the actual needs. URLLC for example has high reliability requirements and consequently the quantity of control information is very small even about 0. URLLC is transmitted via PUSCH and the payload of URLLC has higher reliability requirement than the control information. Though the capacity of PUSCH may be larger than the capacity of PUCCH and only a small part of PUSCH may be used to transmit UCI. Consequently, the resource which is available for transmitting UCI is very limited. PUCCH is specified for UCI transmission. However, PUSCH is a transport channel and may be used for data transmission and UCI may only be piggybacked or multiplexed if needed or on demand. When PUCCH and PUSCH collide in the time domain, UCI needs to be piggybacked in PUSCH. Or in other words, if the capacity for the PUCCH is not large enough to transport the information at least a portion of the PUSCH can be used to transport at least a portion of the information that is to be transmitted in the PUCCH. This transport may only be on a temporary basis, for example when a temporary overload situation occurs.

The quantity of control information that can be transmitted over the granted resource such as PUSCH is determined by reliability requirements of uplink data. For example, if the reliability requirement of PUSCH is 10-6 the quantity of control information is 0 or 1. if the reliability requirement is lower, e.g. 10-1, the quantity is higher, e.g. 10. The transported control information may flexibly be adapted to changing reliability requirements.

In NR, UCI types may comprise at least a SR (Scheduling Request) signal, HARQ-ACK (Hybrid Automatic Repeat Request-Acknowledge) signal and a CSI signal. The SR signal may be used to request by a user equipment (UE) from a base station (BS) a granted resource in order to transmit information over this granted resource. The HARQ-ACK signal is used by the UE to acknowledge the correct reception of information transmitted by the BS to the UE.

The CSI signal generally indicates the quality of a channel as determined by the UE and is reported from the UE back to the BS. In particular, the CSI signal may comprise two parts. A first part is named as CSI part1 and a second part is named as CSI part2.

Furthermore, two types of CSI signals exist. The first type of the CSI signal is denoted Type I CSI feedback.

The first part of the Type I CSI signal, i.e. Part 1 of Type I CSI, comprises a RI (Rank Indicator), a CRI (CSI-RS (Channel state information reference signal) Resource Indicator) and a CQI (Channel Quality Indicator) for the first codeword information. RI and CRI are only provided if reported by UE. The RI signal provides an indication of the correlation and/or interference between antennae of a MIMO (Multiple Input Multiple Output) system. The higher the RI value the lower the interference. The CQI signal provides information about the quality of a channel between the BS and the UE.

A CSI-RS Resource Indicator is used if the network device or gNB sends multiple CSI-RS in multiple CSI-RS resources, In such a case a UE selects the CSI-RS resource with best channel condition to report.

The second part of the Type I CSI signal, i.e. Part 2 of Type I CSI, comprises PMI and comprises the CQI signal for the second codeword when RI>4, i.e. the value of the RI signal is greater than the value 4.

The second type of the CSI signal is denoted Type I CSI feedback.

The first part of the Type II CSI signal, i.e. Part 1 of Type II CSI signal, has a fixed payload size and contains RI, CQI, and an indication of the number of non-zero wideband amplitude coefficients per layer for the Type II CSI. The fields of Part 1—RI, CQI, and the indication of the number of non-zero wideband amplitude coefficients for each layer—are separately encoded.

The second part of the Type II CSI signal, i.e. Part 2 of Type II CSI signal, comprises the PMI of the Type II CSI. Part 1 and 2 are separately encoded.

A configured grant resource may be a resource granted by a network device such as a BS (base station). For example, a BS may grant a channel or at least a part of a channel to be used by the terminal or UE. Substantially only after the BS has granted the resource the terminal or UE may be capable of using this resource. A resource can be an uplink channel between terminal or UE and BS which allows the UE to send information from the UE to the BS, e.g. via the PUSCH (Physical uplink shared channel).

In this text, a terminal is provided. In further examples a transmission channel assignment apparatus, a method for controlling a transmission over a transmission channel, a program element and a computer-readable medium are described.

In general, a signal may be denoted according to the information it carries.

The term piggyback may describe transmitting or multiplexing a signal or multiplexing a signal into another signal. For example, PUSCH is usually a channel used for payload data which is to be sent from the UE to the BS in order to distribute the payload data to a destination. By multiplexing control information into the payload data, the channel which is usually used for payload data may also be used for control information. For example, in a case where the usual control channel, e.g. PUCCH, does not have enough capacity to carry all the control information, at least parts or a portion of the control information are/is distributed over the payload channel. e.g. the PUSCH. Such a limitation in capacity may occur if PUCCH and PUSCH fully or partially overlap in the time domain, In such a situation the UCI which is supposed to be transported in PUCCH is piggybacked or shifted into the PUSCH, and PUCCH is not transmitted. In order to still guarantee a predefined QoS (Quality of Service) of the payload channel the access of control information to the payload channel may be controlled and monitored. If too much control information is to be transmitted to the payload channel, the overall payload bandwidth, the overall payload rate and/or the overall payload capacity of the payload channel may be reduced since parts of the payload capacity are used by the control information. In order to prevent an overload of the payload channel by the control information only a part or a portion of the control information which is intended to be transmitted over the payload channel is transmitted and the other part or the other portion of control information is dropped and/or blocked from being transmitted.

According to an aspect of the present disclosure a terminal or UE and a network device, e.g. a BS or gNodeB are provided.

The subject-matters of the present disclosure are provided in the independent claims. Features of further exemplary implementations of the present disclosure are provided in the dependent claims.

According to an aspect of the present disclosure a terminal or UE is provided, which is configured with configured grant resource. The terminal or UE is adapted to transmit limited control information in the configured grant resource.

In other words, a resource such as a transmission channel is allocated to the terminal. The terminal may receive control information and decide which portion of the control information can be transmitted over the transmission channel.

In an example substantially, only UCI information on URLLC can be piggybacked in the configured grant resource, otherwise it/they may be dropped. In another example substantially, only HARQ-ACK can be piggybacked in configured grant resource.

According to an aspect of the present disclosure the terminal which is configured with the configured grant resource comprises a processor and a transceiver. The processor is configured to determine at least one UCI type that needs to be transmitted and/or piggybacked on the configured grant resource from a plurality of UCI types which are configured for the terminal and the transceiver is configured to transmit control information of the at least one UCI type by using the configured grant resource.

The terminal may receive a plurality of pieces of UCI information and decide which part or which portion the terminal may transmit over the grant resource such as the transmission channel. The decision about which portion may be transmitted may be based on information type and/or on information size.

According to an aspect of the present disclosure the at least one UCI type indicates HARQ-ACK.

According to an aspect of the present disclosure the priority of the at least one UCI type is higher than the priority of the other UCI types of the plurality of UCI types.

In other words, the plurality of UCI types which are to be transmitted have a different priority level. Based on this priority level the terminal decides which portion of the plurality of pieces of UCI information to be transmitted.

According to another aspect of the present disclosure the multiple UCI types comprise at least one of HARQ-ACK, CSI part1, CSI part2 and SR.

In one example the UCI type includes HARQ-ACK. CSI part1, CSI part2 and SR According to another aspect of the present disclosure the at least one UCI type indicates the UCI on URLLC.

According to yet another aspect of the present disclosure the at least one UCI type indicates a HARQ-ACK bit of URLLC.

According to another aspect of the present disclosure the plurality of UCI types comprises at least one of a UCI for URLLC and a UCI for eMBB.

According to another aspect of the present disclosure the processor is further configured to drop off control information of the other UCI types in the plurality of UCI types except for the determined at least one UCI type.

The terminal may determine a type of UCI information to be transmitted from a plurality of UCI types. The UCI types of the plurality of UCI types that are determined as not to be transmitted can be omitted.

According to another aspect of the present disclosure the transceiver is configured to transmit the control information of the determined at least one UCI type by using the configured grant resource on PUSCH.

According to another aspect of the present disclosure a terminal is provided configured with the configured grant resource. The terminal comprises a processor and a transceiver. The processor is configured to determine a number of resource elements needed for transmitting UCI information and a number of resource elements in the configured grant resource configured by a network device. The processor is configured to instruct the transceiver to transmit a portion of the UCI information by using the resource elements in the configured grant resource configured by the network device, if the number of resource elements needed for transmitting the UCI information is larger than the number of resource elements configured by the network device.

In other words, the terminal may be adapted to fill the resource elements which are configured to transport the UCI information. If all available resource elements are filled with UCI information the remaining UCI information is dropped.

According to another aspect of the present disclosure the portion of the UCI information indicates partial bits of UCI.

The size of the resource blocks may be in bits and therefore a certain number of bits of the UCI information can be transmitted. The exceeding bits of UCI information may be dropped.

According to another aspect of the present disclosure the processor is further configured to drop off the other portion of UCI information except the portion of UCI information that can be transmitted by the resource elements in the configured grant resource configured by the network device.

By dropping off information a selection of the information to be transmitted is made.

According to an aspect of the present disclosure the portion of the UCI information is HARQ-ACK.

According to an aspect of the invention the portion of the UCI information are HARQ-ACK bits of URLLC.

According to an aspect of the invention the transceiver is configured to transmit the portion of UCI information by using the resource elements in the configured grant resource configured by the network device on PUSCH.

According to another aspect of the present disclosure the terminal comprises a transmission channel assignment apparatus. The transmission channel assignment apparatus comprises a transmission channel controlling device, wherein the transmission channel controlling device is adapted to piggyback or to transmit limited control information in a configured grant resource.

According to yet another aspect of the present disclosure a method for controlling a transmission over a transmission channel is provided, comprising piggybacking or transmitting limited control information in a configured grant resource.

According to another aspect of the present disclosure a program element is provided, which, when being executed by a processor is adapted to carry out the method for controlling the transmission over the transmission channel.

According to another aspect of the present disclosure a computer-readable medium comprising program code is provided, which, when being executed by a processor is adapted to carry out the method for controlling the transmission over the transmission channel.

A computer-readable medium may be a floppy disk, a hard disk, an USB (Universal Serial Bus) storage device, a RAM (Random Access Memory), a ROM (read only memory) or an EPROM (Erasable Programmable Read Only Memory). A computer readable medium may also be a data communication network, e.g. the Internet, which may allow downloading a program code.

According to an aspect of the invention a first implementation may be described. According to this implementation, limited UCI type(s) can be piggybacked in configured grant resource, otherwise it/they can be dropped. Limited UCI type(s) can be configured or indicated by other parameters or defined in spec.

In other words, limited one or more UCI type/UCI types can be piggybacked or transmitted in a resource after the resource has been configured and granted. For example, in order to transmit data over a PUSCH a UE or terminal requests the network device or BS to allow for such transmission. The BS informs the UE about a configuration of the channel necessary for the transmission and grants the resource, i.e. informs the UE that the BS is ready to receive the information. The limitation of the UCI types may be made according to a predefined rule in order to prevent that too much UCI information may reduce the capacity of the channel. Otherwise, in cases where too much UCI information is to be transmitted over the channel, substantially only the limited one or more UCI type/UCI types may be transmitted, and the other one or more UCI type/UCI types can be dropped. The one or more limited UCI type/UCI types that can be multiplexed can be predefined, configured or indicated by other parameters or they can be defined in a spec, such as the standard TS 38.214. The UCI signal may comprise a plurality of UCI types which form sub groups of the overall UCI information. By limiting the UCI information to limited one or more UCI type/UCI types the quantity of control information transmitted over the payload channel may be controllable.

For example, it may be predefined, configured or indicated that only HARQ-ACK can be piggybacked in a resource after the resource has been configured and granted and that other UCI types than the UCI type HARQ-ACK, have to be dropped. In this case for example all control information having the UCI type HARQ-ACK will let passed but other types such as the UCI type CSI will be dropped.

The one or more limited UCI type/UCI types that are allowed to be transmitted, e.g. only HARQ-ACK, are configured by at least one higher layer parameter. In an example a higher layer may indicate by a parameter and/or by an information element (IE) which UCI type/UCI types are allowed to be transmitted. For example, in order to specify the admitted UCI type/UCI types the one or more UCI type/UCI types are configured during the grant procedure of the resource, it/they is/are predefined in PUSCH and/or it/they is/are configured as betaoffset for UCI type(s). The betaoffset may be the MCS (Modulation Coding Scheme) offset between control information or UCI information and data transmitted in the transport channel. The betaoffset are defined for a UE to determine the required number of resources for multiplexing HARQ-ACK information and for multiplexing CSI reports in a PUSCH. If the betaoffset is zero (betaoffset=0), UCI information cannot be multiplexed in the transport channel, e.g. PUSCH. In another example the limited UCI type/UCI types are defined in the specification, e.g. it is defined in specification that only HARQ-ACK can be piggybacked or transmitted in a configured grant resource. The resource may be granted by a network device.

In another example by the same principles the allowed or admitted UCI type/UCI types may be restricted to HARQ-ACK and SR only. In this case, substantially only control information of the type HARQ-ACK and SR can be piggybacked in a configured grant resource, and control information of other type such as of type CSI may be dropped.

Again, the admitted type of control information is configured by higher layer parameters, e.g. by UCI type(s) in configured grant. UCI type(s) in PUSCH and/or betaoffset for UCI type(s) and/or fixedly predetermined by specification.

In yet another example the admitted control information to be transmitted may be defined on the basis of a certain portion of information within the same type of control information. For example. Type I and/or Type II CSI information may have two predefined parts, Part 1 and Part 2. In such a case it may be configured by higher layer parameter and/or predefined in specification that only a part, a portion and/or a subgroup of the control information may be allowed to be transmitted over the payload channel and the other part may be dropped. In the example that a Type I CSI control information having two parts is provided, part 1 can be piggybacked in configured grant resource, and CSI part 2 can be dropped. Thus, it may be possible to pre-set that e.g. SR, HARQ-ACK and CSI part 1 only are allowed to be transmitted and all other control information is dropped and not transmitted.

Instead of specifying which information is allowed to be transmitted it is also possible to specify which information is to be dropped. Therefore, instead or in addition to permitting Type I CSI part1 it is possible to indicate that Type I CSI part 2 information may be dropped.

In this example CSI reporting using PUSCH may be implemented. CSI reporting on PUSCH can be multiplexed with uplink data on PUSCH. For Type I and Type II CSI feedback on PUSCH, a CSI report comprises two parts. Part 1 shall be transmitted in its entirety before Part 2 and is used to identify the number of information bits in Part 2. When CSI reporting on PUSCH comprises two parts, the UE may omit a portion of the Part 2 CSI.

According to an aspect of the present disclosure a second implementation may be described. In this example high priority control information or UCI information can be piggybacked in configured grant resource, other control information may be dropped.

The priority may be configured using the same principles as configuring the type of admitted information. Thus, high priority control information and/or UCI(s) may be configured or indicated by other parameters or defined in spec.

The priority may also be defined based on a message type. For example, only control information on special message type, e.g. UCI on URLLC (Ultra-Reliable Low-Latency Communication), may be piggybacked and transmitted in the configured grant resource. Information in other message types may be dropped and not transmitted.

In other words, the decision which control information is transmitted and which information is dropped may be made on the basis of a priority and/or on a message type. For example, the message type may be related to a certain priority level. High priority UCI information can be piggybacked in the configured grant resource, otherwise lower priority UCI(s) can be dropped. High priority UCI(s) can be configured or indicated by other parameters or defined in spec.

In the example of UCI on URLLC control information is transmitted over massage type indicating high priority traffic. In this example only UCI information on high priority traffic. e.g. on URLLC, can be piggybacked in configured grant resource, and UCI on lower priority traffic, e.g. eMBB (enhanced Mobile Broadband) can be dropped. URLLC traffic may be indicated as traffic of higher priority than eMBB traffic which is indicated as low priority traffic.

High priority UCI (s), e.g. UCI on URLLC, are configured by higher layer parameter(s), e.g. UCI type(s) in configured grant, UCI type(s) in PUSCH and/or betaoffset for UCI type(s).

Further, the parameter(s) can be configured for URLLC and eMBB separately or in common or UCI(s) corresponding to different physical parameter separately or in common, e.g. HARQ-ACK for PDSCH scheduled by DL grant scrambled by MCS-C-RNTI and C-RNTI.

The limitation for the selection of limited UCI types may be defined in a specification. Thus, in an example the specification may define that only control information on a message having a certain priority, e.g. only UCI on URLLC, can be piggybacked, multiplexed or transmitted in the configured grant resource. In another example it may be defined in the specification that only control information that is triggered by a certain grant information, e.g. UCI triggered by DL grant scrambled by MCS-C-RNTI, can be piggybacked or transmitted in configured grant resource.

If a parameter is specified in a specification, this parameter may be fixed in a register of the transmission channel assignment apparatus. If the parameter is indicated by high layers the parameter may be provided by a parameter specifying interface within the transmission channel assignment apparatus, e.g. by an information element (IE).

In an example different parts of CSI information may have different priorities. In this case CSI with high priority can be piggybacked in configured grant resource; CSI with lower priority can be dropped. CSI priority can be configured by a high layer parameter, e.g. CSI priority. In another example the CSI priority may be defined in a specification, e.g. priority sequence is wideband CSI> subband CSI, and/or CSI report n>CSI report m, if n<m. In other words, the priority of wideband CSI is higher than the priority of subband CSI, and/or the priority of CSI report n is higher than the priority of CSI report m where n and m are integer an n is smaller than m.

According to an example, omission of Part 2 CSI is according to the priority order according to a priority table, where for example a number such as $N_{rep}$ is the number of CSI reports configured to be carried on the PUSCH. In such a table different priority levels may be defined and thus, the priority information may be provided in form of a table.

According to yet another aspect of the invention a third implementation may be described. In this implementation, limited number of UCI bit(s) can be piggybacked in configured grant resource, remaining UCI bit(s) can be dropped. Limited number of UCI bit(s) can be configured or indicated by other parameters or defined in spec. A Fixed number of resource elements or resource elements(s) corresponding to the limited number of UCI bit(s) are used for piggyback; or up to M resource elements corresponding to up to K UCI bit(s) are used for piggyback. For example, up to N UCI bit(s) can be piggybacked in configured grant resource, remaining UCI bit(s) can be dropped. For example, there are M=10 UCI bits, but only 5 UCI bits can be piggybacked, then 5 UCI bits are piggyback, the others (5 UCI bits) are dropped.

In other words, the selection of information to be transmitted may be made on a bit level. In an example the number of bits may be defined that can be transmitted. Bits exceeding this predefined number of bits may be dropped and not transmitted.

In a further example N may be a number of bits and this number is configured by a high layer parameter. Further N may be configured for configured grant resource and dynamic resource separately or in common. A dynamic resource may be a resource such as a channel which is dynamically scheduled by UL grant. UL grant is a specific physical control channel information sent from the network device, e.g. eNodeB, to the UE and informing the UE to start transmitting data and/or to indicate that the resource has been granted and is ready to transmit information. The configured grant resource may be semi-statically or semi-persistently configured.

In another example, a predefined number of resource elements is used for piggyback and thus limits the transportable control information. In yet another example a number of resource elements which corresponds to the limited number of UCI bits is used for piggyback. In a further example up to M resource elements corresponding to up to K UCI bit(s) are used for piggyback. In other words, the transportable control information is limited to a maximum number of bits, maybe K bits. This maximum number K of transportable bits corresponds to a maximum number M of resource elements necessary to transport these K bits. Thus, it indirectly may set the maximum number of transportable bits to set the number of transportable resource elements (RE).

According to yet another aspect of the invention a fourth implementation may be described. In this implementation, the number of resource element(s) used for piggybacked UCI in configured grant resource should be limited. If UCI bit(s) are larger than capacity of the above REs, remaining UCI bit(s) are dropped. The number of resource element(s) used for piggybacked UCI in configured grant resource can be configured or indicated by other parameters or defined in specification. For example, 4 resource elements are used for piggybacked UCI. If UCI needs 4 resource elements, then 4 resource elements are used. If UCI needs 3 resource elements, then 3 resource elements are used. If UCI needs 5 resource elements, then 4 resource elements are used for piggybacked UCI, and then the remaining UCI bit(s) should be dropped. For example, 4 resource elements are used for piggybacked UCI. If UCI needs 4 resource elements, then 4 resource elements are used. If UCI needs 3 resource elements, then 4 resource elements are used, in which one resource element may be used or blanked. If UCI needs 5 resource elements, then 4 resource elements are used for piggybacked UCI, and then the remaining UCI bit(s) should be dropped.

In other words, the number of resource elements which are usable for transporting control information in a transmission channel are limited by limiting the number of REs in the transmission channel which are usable for control information. If the number of bits used for control information, e.g. the number of UCI bits, exceeds the capacity of the usable REs, the exceeding bits of the control information, e.g. UCI bits, are dropped and not transmitted.

The capacity of resource elements used for piggybacked control information, for piggybacked UCI and/or for transportable control information is defined by the configured modulation and code rate, or by upper bound of capacity. e.g. the same modulation as data, but code rate=1, or highest modulation and code rate=1. The capacity of a resource element for UCI depends on MCS (Modulation Coding Scheme) for UCI. The code rate is the number of information bits divided by the number of channel coded bits (code rate=information bit number/channel coded bit number), in an example the code rate is the number of UCI bits divided by the number of resource elements available for UCI information times modulation order (UCI bit number/(number of resource element for UCI *Modulation order)). The modulation order is a parameter that can be mapped to a modulation method. In an example QPSK has a modulation order of 2, 16 QAM has a modulation order of 4, 64 QAM has a modulation order of 6, 256 QAM has a modulation order of 8.

The indication for the number of resource elements can use the same principles as described above. Thus, the number of resource elements used for piggybacked UCI in configured grant resource can be configured or indicated by other parameters or defined in spec.

According to an aspect of the invention a fifth implementation may be described. In this example the above implementation can be combined partly or fully. For example, only HARQ-ACK bit of URLLC can be piggybacked in configured grant resource, otherwise it/they can be dropped. For example, only HARQ-ACK bit can be piggybacked or transmitted in up to N resource elements in configured grant resource, otherwise it/they can be dropped. N is an integer.

In other words, for example, only control information bits, e.g. HARQ-ACK bits, which are transported in URLLC type traffic can be piggybacked in the configured grant resource. Thus, only control information which is provided on the control information input interface for URLLC type traffic is forwarded via the transmission channel interface. Other configuration, even HARQ-ACK which is provided as other type traffic than URLLC is dropped, blocked or filtered out.

In an example, only HARQ-ACK bit can be piggybacked in up to N resource elements in configured grant resource, all other control information is dropped. N is an integer. In another example, high priority UCI bits can be piggybacked in up to N resource elements in configured grant resource. After the high priority UCI bits have been piggybacked in the N resource elements, UCI bits of lower priority are dropped. N is an integer. UCI information or control information of high priority is at least one configuration selected from the group of control information or configuration information consisting of HARQ-ACK control information, SR control information, CSI part 1 control information and CSI part 2 control information.

According to an aspect of the present disclosure a sixth implementation may be described. In this example the above configuration can be configured by different types of configured grant resource, or different of configured grant resources.

In other words, it is possible to configure a plurality of transmission channels for transporting configuration information or control information and thus forming a plurality of sub-transmission channels which form part of an overall transmission channel. In such an example for every control information type a separate transmission channel may be configured and granted. In an example there are separate transmission channels for UCI, HARQ-ACK, Type I CSI part 1, Type I CSI part 2, Type II CSI part 1 and/or Type II CSI part 2 control information.

In summary, the present disclosure provides methods to transmit necessary UCI information and meet reliability. If the UCI resource element is restricted, then a resource for data transmission may be provided which is sufficient enough to transmit information and the code rate used for data transmission is kept low enough to achieve certain reliability requirements.

In an example a UCI piggyback method is provided.

According to an aspect of the present disclosure a transmission channel assignment apparatus or processor is provided, wherein the limited control information is/are limited Uplink Control Information (UCI) type(s).

According to an aspect of the present disclosure limiting the control information is made by dropping other control information than the limited control information.

In an example the control information is limited by adapting a code rate. In another example the control information is limited by adapting a modulation. For example, the code rate is limited in order to meet predefined reliability requirements.

According to yet another aspect of the present disclosure the limit for the limited control information can be configured or indicated on other parameters, defined in a specification, based on a priority, based on a portion of the control information, based on a number of bits, based on a resource element, e.g. the size of a RE, or by providing a limited number of resource elements.

According to yet another aspect of the present disclosure the transmission channel controlling device further comprises a transmission channel interface for connecting a transmission channel, e.g. for connecting a PUSCH, a control information input interface for receiving the control information to be transmitted via the transmission channel interface and a grant interface for receiving information for configuring the transmission channel interface and/or the transmission channel as the granted resource.

The transmission channel controlling device is adapted to piggyback, to multiplex and/or to transmit a selection of the control information received on the control information input interface in the transmission channel interface and/or in the transmission channel, if the transmission channel interface and/or the transmission channel is configured as a granted resource.

Configuring the transmission channel interface and/or the transmission channel may comprise reserving or allocating a part or portion of the transmission channel for control information.

The transmission channel assignment apparatus in example may be an instance of a coding processing chain ensuring that the control information provided to the configured part of the transmission channel does not exceed a predefined condition.

According to another aspect of the present disclosure the selection of control information is made by dropping of at least parts of the received control information.

According to yet another aspect of the present disclosure dropping of at least parts of the received control information is made by a filter and/or by a rate control device, in particular a coding rate control device. In an example the filter may applies a formula.

According to another aspect of the present disclosure the selection of the control information is made based on at least one selection criteria of the group of selection criteria consisting of the grant resource, a type of control information, a priority, a predefined criterion, a parameter, a resource element, in particular a size of resource element, a criterion configured by a higher layer.

According to another aspect of the present disclosure the control information is UCI control information, URLLC control information, in particular control information marked as URLLC traffic, HARQ-ACK control information for received PDSCH data, HARQ-NACK control information for received PDSCH data. Channel Quality Indicator (CQI), precoding matrix indicator (PMI), precoding type indicator (PTI), rank indication (RI).

According to another aspect of the present disclosure the resource is granted by a UL Grant signal and/or by a DCI 0 signal.

According to another aspect of the present disclosure the method for controlling a transmission of control information over a transmission channel comprises dropping other control information than the limited control information.

According to yet another aspect of the present disclosure the method for controlling a transmission of control information over a transmission channel comprises receiving on a control information input interface the control information to be transmitted via a transmission channel interface. The method also comprises receiving on a grant interface information for configuring the transmission channel interface and/or the transmission channel as the granted resource. And the method in addition comprises piggybacking, multiplexing and/or transmitting a selection of the control information received on the control information input interface in the transmission channel interface and/or in the transmission channel, if the transmission channel interface and/or the transmission channel is configured as a granted resource According to yet another aspect of the present disclosure the method further comprises selecting of control information by dropping of at least parts of the received control information.

According to another aspect of the present disclosure a network device is provided. The network device is adapted to configure a terminal to transmit limited control information in a configured grant resource.

In an example the network device is adapted to configure the terminal with the configured grant resource. In other words, the network device may be adapted to send instructions to the terminal which configure a resource such as a transmission channel in such a way to have some restrictions, rules or filters.

According to another aspect of the present disclosure the network device comprises network device processor and a network device transceiver, wherein the network device processor is adapted to generate instructions to configure the terminal to transmit limited control information in a configured grant resource. The network device transceiver is adapted to transmit the instructions to the terminal.

In an example the processor may also be adapted to provide instructions for granting the resource.

It has to be noted that aspects of the present disclosure have been described with reference to different subject-matters. In particular, some aspects have been described with reference to apparatus type claims whereas other aspects have been described with reference to method type claims. However, a person skilled in the art will gather from the above and the following description that, unless other notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed. Also, aspects of the apparatus type claims are mutual exchangeable.

SHORT DESCRIPTION OF DRAWINGS

Further implementations of the invention are described in the following description of the Figures. The invention will be explained in the following in detail by means of implementations and with reference to the drawing in which is shown:

DETAILED DESCRIPTION

Figure 1:
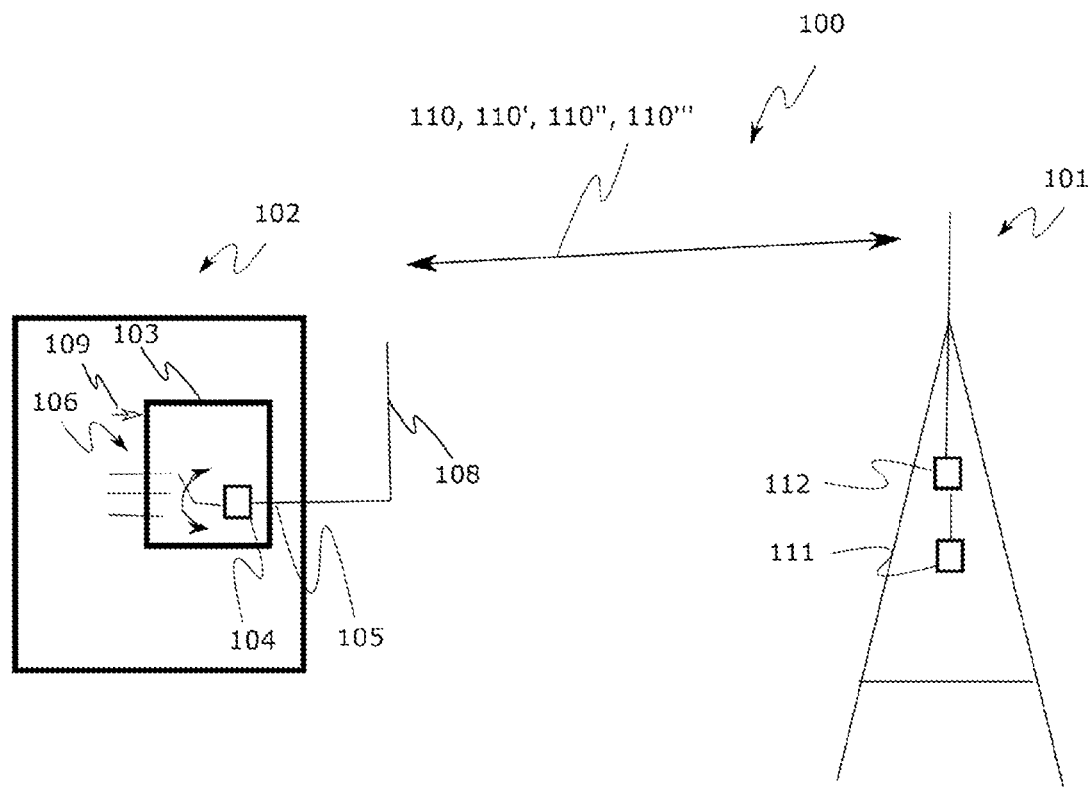
FIG. 1 shows a communication system with a UE having a transmission channel assignment apparatus according to an exemplary implementation of the present disclosure.

In the following the same reference numerals will be used for parts having the same or equivalent function. Any statements made having regard to the direction of a component are made relative to the position shown in the drawing and can naturally vary in the actual position of application.

FIG. 1 shows a communication system 100 with a terminal 102 or UE 102 having a processor 103 or a transmission channel assignment apparatus 103 according to an exemplary implementation of the present disclosure. The terminal 102 or UE 102 is in a communication relation with a network device, e.g. a base station (BS) 101 via connection 110. The connection 110 may comprise all links and/or channels established between UE 102 and BS 101. The connection 110 comprises a DL control channel 110' and a transmission channel 110". The transmission channel 110" is an uplink channel, i.e. directed from UE 102 to BS 101 whereas downlink control channel 110' is directed from BS 101 to UE 102. The transmission channel 110" may be a PUSCH channel 110".

All the channels are transmitted and/or received via antenna 108. Transceiver 104 or transmission channel controlling device 104 controls the transmission over antenna 108.

Transmission channel 110" is used for payload sent from UE 102 to BS 101. However, a portion of transmission channel 110" can be configured by BS 101 via information sent on the DL control channel 110' as an UL control sub-channel or UL configuration sub-channel. On this control channel or configuration channel control information may be sent from UE 102 to BS 101. For this purpose, BS also needs to grant access to the transmission channel 110" in particular to the UL control sub-channel 110''' or configuration sub-channel 110'''.

Configuration information or control information may be, UCI control information, URLLC control information, in particular control information marked as URLLC traffic. HARQ-ACK control information for received PDSCH data, HARQ-NACK control information for received PDSCH data. Type I CSI part 1, Type I CSI part 2, Type II CSI part 1 and/or Type II CSI part 2, Channel Quality Indicator (CQI), precoding matrix indicator (PMI), precoding type indicator (PTI), rank indication (RI).

Control information is provided via control information input interface 106 to the transmission channel assignment apparatus 103 of UE 102.

Higher layer configuration information or control information may be provided by high layer interface 109. Via this interface configuration parameter or control parameter may be provided, e.g. by using an information element (IE). In an example a PUSCH-Config Information Element according to TS 38.331 may be used.

The transmission channel assignment apparatus 103 or processor has a transmission channel controlling device 104 or transceiver 104 which is adapted to piggyback or transmit limited control information in a configured grant resource.

In other words, the transmission channel controlling device 104 comprises a transmission channel interface 105 for connecting a transmission channel, e.g. PUSCH. The transmission channel controlling device 104 further comprises a control information input interface 106 and a grant interface (not shown in FIG. 1).

The control information input interface 106 is adapted for receiving the control information to be transmitted via the transmission channel interface 105. The grant interface is adapted for receiving information for configuring the transmission channel interface and/or for configuring the transmission channel as the granted resource. The configuration may indicate which portion of the transmission channel and/or of the transmission channel interface 105 may be used as control information sub-channel. The configuration as a granted resource indicates that the transmission channel and/or the transmission channel interface is prepared for sending information. In particular the grant indication indicated that the BS 101 is prepared to receive control information on the control sub-channel 110''' or configuration sub-channel 110'''.

The transmission channel controlling device 104 or transceiver 104 is adapted to piggyback transmit a selection of the control information received on the control information input interface 106 in the transmission channel interface 105 and/or in the transmission channel 110", 110''', if the transmission channel interface 105 and/or the transmission channel 110", 110''' is configured as a granted resource.

The configuration may comprise selecting a sub-channel 110''' of the transmission channel 110" as a channel reserved for control information. Configuring the transmission channel as granted resource may comprise indicating by grant interface that the BS is ready to receive control information on the configured transmission channel.

The network device 101 comprises network device processor 111 and a network device transceiver 112, wherein the network device processor 111 is adapted to generate instructions to configure the terminal 102 to transmit limited control information in a configured grant resource 110'''. The network device transceiver 112 is adapted to transmit the instructions to the terminal as well as receive control information in the configured grant resource 110'''.

In an example the network device processor 111 may also be adapted to provide instructions for granting the resource.

Figure 2:
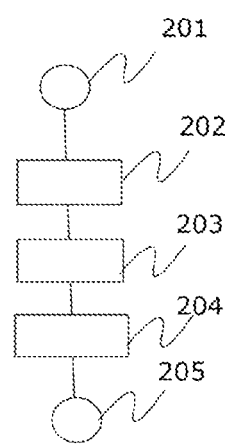
FIG. 2 shows a flowchart of a method for controlling a transmission of control information over a transmission channel.

FIG. 2 shows a flowchart of a method for controlling a transmission of control information over a transmission channel. The method starts in idle state S201.

The method comprises piggybacking and/or transmitting limited control information in a configured grant resource. For that purpose, in state S202, the method comprises receiving on a control information input interface 106 the control information to be transmitted via a transmission channel interface 105, in particular on a transmission channel 110", 110'".

In state S203 the method comprises receiving on a grant interface information for configuring the transmission channel interface 105 and/or the transmission channel 110", 110'" as the granted resource.

Furthermore, in state S204 the method comprises piggybacking a selection of the control information received on the control information input interface 106 in the transmission channel interface 105 and/or in the transmission channel 110", 110'", if the transmission channel interface 105 and/or the transmission channel 110", 110'" is configured as a granted resource. In other words, after the transmission channel 110", 110'" is granted the configured part 110'" of the transmission channel 110" can be used to transmit control information or configuration information as set up with the configuration.

The method ends in state S205

In an example the number of resource elements used for piggybacked UCI in configured grant resource can be configured by higher layer parameter directly or indirectly e.g. by configuring the ratio of available resource elements. In an example a rate matching algorithm may be used. The employed method may depend on required resource for data and the target to be achieved. Furthermore, a number of resource elements can be configured for configured grant resource and dynamic resource separately or in common. In other words, a number of resource elements can be configured for configured grant resource and a number of resource elements can provided as dynamic resource which may be granted on demand.

In an example the limited control information that can be piggybacked in a configured grant resource may be calculated for different types of control information or for different types of UCI according to different formulas. For the control information type, in particular for the UCI types HARQ-ACK, CSI part 1 and CSI part 2 the portion to be transmitted on the configured grant resource, e.g. on PUSCH, may be calculated according to a formula. There might be a formula for the portion of UCI to be transmitted such as a formula for the number of HARQ-ACK bits, a formula for the number of bits for CSI part 1 and a formula for the number of bits for CSI part 2 to be transmitted. A monitoring device may ensure that not more than the allowed bits may be transmitted.

In an example the portion Q of UCI to be transmitted may be calculated as the minimum value of the number of required resources for UCI and the number of restricted resources. In this formula UCI may be HARQ-ACK bits, bits for CSI part 1 and/or bits for CSI part 2.

In a general formula format:

Q=min {Required resource for UCI, Restricted resource for UCI}

In all these formulae a variable $\alpha$ may be used which is configured by a higher layer parameter, e.g. by the higher layer parameter "scaling". The parameter "scaling" indicates a scaling factor to limit the number of resource elements assigned to UCI on PUSCH. The variable $\alpha$ may allow for combining different UCI types as long as a resource is available. Thus, HARQ-ACK bits, bits for CSI part 1 or bits for CSI part 2 may be loaded on an available resource as long as the capacity of the resource is not exceeded. This variable or factor $\alpha$ allows for considering the type and/or priority of the control information when loading an available granted resource. Thus, a mixture of different types of control information is possible.

For control information, e.g. UCI, which is piggybacked in a configured grant resource the priority is selected such, that the HARQ-ACK type has a higher priority than CSI Part1 type. And the CSI Part1 type has a higher priority than the CSI Part 2 type.

If the resource or transmission channel is already consumed or occupied by HARQ-ACK type control information then any CSI type control information, i.e. CSI part 1 type and CSI part 2 type information is dropped.

If resource or transmission channel is already consumed for and/or occupied by HARQ-ACK type information and CSI part 1 type information, then CSI part 2 type information is dropped.

Or in other words, if the difference of the provided resource for UCI and the required resource for UCI equals zero, UCI information of lower priority may be dropped. (Provided resource for UCI− Required resource for UCI=0). A corresponding factor may be multiplied with the formula and when this difference equals zero the corresponding par may not be taken into account.

In another example w % here HARQ-ACK information and CSI part1 information may be used, the provided resource for UCI is reduced by the required resource for HARQ-ACK and reduced by the required resource for CSI part1. The remaining rest of the resource may be used for CSI part2 bits.

If however [Provided resource for UCI−Required resource for HARQ-ACK−Required resource for CSI part1=0] no resource for CSI part2 bits is available.

These formulae allow for taking into account the priority which different types of control information have in respect to another and/or allow to determine which type of control information can be transmitted via the limited resource.

A resource element may have a predefined capacity of bits and there for is a limited provided resource.

In an example it may be assumed that 4 resource elements are used for piggybacked UCI. If UCI needs 4 resource elements, for example when the control information provided on the control information input interface needs 4 resource elements, then 4 resource elements are used. If UCI needs 3 resource elements, then 3 resource elements are used. If UCI needs 5 resource elements, then 4 resource elements are used for piggybacked UCI, then the remaining UCI bit(s) should be dropped. In this way the control information provided via the control information input interface and exceeding the transmission channel configured for transmission of control information, the exceeding portion of control information is dropped. The transmission channel may be a portion of a general transmission channel which is configured and/or adapted to transport control information. This configured portion defines the capacity of the transmission channel and may defines the capacity of a respective transmission channel interface. This portion configured for the transport of the control information may be a subchannel of the transport channel.

In another example, the capacity of the configured transport channel is always used and in case of under occupation, the capacity is filled up with void information. For example, in an assumption 4 resource elements are used for piggybacked UCI or 4 REs of the transport channel are configured to carry control information. If UCI needs 4 resource elements, then 4 resource elements are used. If UCI needs 3 resource elements, then 4 resource elements are used, in which one resource element may be used or blanked or filled with void information. If UCI needs 5 resource elements, then 4 resource elements are used for piggybacked UCI, then the exceeding UCI bit(s) should be dropped.

For example, HARQ-ACK and CSI are piggybacked in configured grant resource. The number of resource elements used for piggybacked UCI is configured by high layer parameter. In one example a number M of available resource elements is provided via higher layer interface 109. In another example the scaling parameter is provided via higher layer interface 109 defining a ratio of available resource elements for UCI piggyback.

If the quantity of information bits of a group of control information types, such as the combination of HARQ-ACK and CSI, is not larger than capacity of resource elements, then all information bits are piggybacked in configured grant resource. In other words, if the quantity of control information provided on control information input interface does not exceed the capacity of the transmission channel reserved for control information transmission, then all control information can be transmitted without dropping config information.

In particular, if the information bit number of HARQ-ACK and CSI is not larger than the capacity of a resource element(s) used for UCI piggyback, then all information bits of HARQ-ACK and CSI are piggybacked in configured grant resource. The capacity of a RE configured to be used for transport of control information, e.g. configured to be used for UCI piggyback, is determined by at least a configured modulation and code rate. The capacity thus may be determined by e.g. a betaoffset and the number of resource elements used for piggybacked UCI.

In an example the UCI capacity is calculated as the size of the resource element multiplied with a modulation order for the UCI and the code rate for the UCI (UCI capacity-=the number of REs* Modulation order for UCI*CodeRate for UCI). In an example QPSK has a modulation order of 2, 16 QAM has a modulation order of 4, 64 QAM has a modulation order of 6, 256 QAM has a modulation order of 8.

In another example the product of a modulation order for the UCI and the code rate for the UCI equals to a betaoffset multiplied with a modulation order for the UCI and the code rate for the UCI (Modulation order for UCI *CodeRate for UCI=betaoffset* Modulation order for UCI*CodeRate for UCI). The betaoffset is the MCS offset between UCI and data.

Otherwise, if information bit number of HARQ-ACK and CSI is larger than the capacity of a resource element(s) used for UCI piggyback, CSI part 2 will be dropped firstly and gradually, until information bits of HARQ-ACK and remaining CSI is not larger than capacity of resource elements used for UCI piggyback. Then the HARQ-ACK and remaining CSI are piggybacked and transmitted in configured grant resource. In other words, depending on the priority of the respective control information type the available RE configured for transmission of control information is filled up and the part of the control information exceeding the capacity is dropped.

For example, HARQ-ACK and CSI are piggybacked in configured grant resource. The number of resource elements used for piggybacked UCI is configured by high layer parameter. e.g. M resource elements or parameter scaling for ratio of available resource elements for UCI piggyback.

If information bit number of HARQ-ACK and CSI is smaller than capacity of resource elements, then all information bits are piggybacked and transmitted in configured grant resource.

Specifically, if the number of information bits of the control information, e.g. a combination of the bits of HARQ-ACK type information and CSI type information is not larger than the capacity of resource elements used for UCI piggyback, then all information bits of HARQ-ACK and CSI are piggybacked in configured grant resource and transmitted with configured modulation and code rate. The capacity is determined by at least a configured modulation and code rate, e.g. betaoffset and the number of resource elements used for piggybacked UCI.

In another example if the number of information bits of the control information, e.g. a combination of different control information types such as a combination of HARQ-ACK type information and CSI type information is larger than capacity of resource, then all or parts of the control information bits of HARQ-ACK and CSI increase the code rate. The capacity of the transmission channel and/or of the transmission channel interface is determined by at least one of a configured modulation and/or a code rate. e.g. by a betaoffset and the number of resource elements used for piggybacked UCI The code rate is not larger than 1, until all information of HARQ-ACK and CSI can be piggybacked and transmitted in configured resource elements for UCI piggyback. In other words, the control information can be transmitted via the transmission channel interface as long as the code rate is below the value 1. The code rate is calculated by multiplying the number of UCI bits with a quotient of the modulation order and the number of available resource elements. (Code rate=the number of UCI bits*Modulation order/resource element number). The code rate is monitored by transmission channel controlling device 104 or transceiver 104.

In yet another example, HARQ-ACK and CSI are piggybacked in configured grant resource and/or via an allocated transmission channel or an allocated transmission channel interface. The number of resource elements used for piggybacked UCI is configured by high layer parameter, e.g. M resource elements or for ratio of available resource elements for UCI piggyback.

In an example where the number of information bits of the control information. e.g. a combination of control information HARQ-ACK and CSI, is smaller than the capacity of resource elements and/or of the allocated transmission channel, then all information bits are piggybacked and transmitted in the configured grant resource, e.g. the configured and granted transmission channel.

In particular, in cases where the number of information bits of the control information, e.g. the number of HARQ-ACK bits and CSI bits, is smaller than the capacity of resource elements used for UCI piggyback, then all information bits of HARQ-ACK and CSI are piggybacked in configured grant resource and transmitted with configured modulation and code rate. The capacity of the REs is determined by a configured modulation and code rate, e.g. betaoffset and the number of resource elements used for piggybacked UCI.

In an example where the number of information bits of the control information, e.g. the number of HARQ-ACK bits and CSI bits is larger than capacity of resource, then all or part of information bits of the control information, e.g. the combination of HARQ-ACK and CSI, increases the code rate. The capacity of the resource is determined by at least one of configured modulation and/or a code rate, e.g.

betaoffset and the number of resource elements used for piggybacked UCI. However, the code rate is always smaller than 1, until all control information, e.g. the combined control information of HARQ-ACK and CSI, can be piggybacked and transmitted in configured resource elements for UCI piggyback.

In another example, where the number of control information bits, e.g. a combination of HARQ-ACK bits and CSI bits, is larger than an upper bound of capacity of resource elements used for UCI piggyback, e.g. highest modulation and code rate=1, or configured modulation and code rate=1, then CSI part 2 will be dropped firstly and gradually, until the number of bits of the control information, e.g. the combination of bits of HARQ-ACK and remaining CSI bits, is not larger than upper bound of capacity of resource elements used for UCI piggyback. Then the HARQ-ACK and remaining CSI are piggybacked and transmitted in configured grant resource. In other words, during transmission of control information a modulation and code rate is monitored against an upper boundary value, e.g. 1. As long as the modulation and code rate exceed the upper boundary value, control information is dropped beginning with the control information of lowest priority until the modulation and code rate does not exceed the upper boundary anymore. The exceeding information may be dropped gradually, without considering any linked information, just based on the available capacity.

It should be noted that the term "comprising" does not exclude other elements or steps and the "a" or "an" does not exclude a plurality. Also, elements described in association with different implementations may be combined.

It should also be noted that reference signs in the claims shall not be construed as limiting the scope of the claims.

LIST OF REFERENCE NUMERALS 100 communication system
101 network device or base station
102 user equipment or terminal
103 transmission channel assignment apparatus or processor
104 transmission channel controlling device or transceiver
105 transmission channel interface
106 control information input interface
108 antenna
109 higher layer interface
110 connection
110' downlink (DL) control channel 110'
110" uplink (UL) channel, transmission channel
110''' control information sub-channel
111 network device processor
112 network device transceiver

What is claimed is:

1. A device comprising: a transceiver and a processor; wherein
the processor is configured to: obtain a parameter configured to indicate number of resource elements used for piggyback UCI bits in configured grant resource configured for PUSCH;
when number of UCI bits to be piggybacked in the configured grant resource is larger than capacity of the number of the resource elements, the processor is further configured to trigger the transceiver piggyback part of the UCI bits on the number of resource elements indicated by the parameter and drop remaining UCI bits; wherein the processor is further configured to:
obtain another parameter configured for indicating number of UCI bits that can be piggybacked in the configured resources, and piggyback the part of the UCI bits in the configured grant resource according to the another parameter.

2. The device of claim 1, wherein priority of the part of the UCI bits is higher than the remaining UCI bits.

3. The device of claim 1, wherein the part of the UCI bits piggybacked in the configured grant resource are HARQ-ACK bits.

4. The device of claim 1, wherein the part of the UCI bits piggybacked in the configured grant resource are UCI bits of URLLC service.

5. A method, comprising:
obtaining a parameter configured to indicate number of resource elements used for piggyback UCI bits in configured grant resource configured for PUSCH;
when number of UCI bits to be piggybacked in the configured grant resource is larger than capacity of the number of the resource elements, the processor is further configured to piggyback part of the UCI bits on the number of resource elements indicated by the parameter and drop remaining UCI bits; wherein the method further comprises:
obtaining another parameter configured for indicating number of UCI bits that can be piggybacked in the configured resource, and piggyback the part of the UCI bits in the configured grant resource according to the another parameter.

6. The method of claim 5, wherein priority of the part of the UCI bits is higher than the remaining UCI bits.

7. The method of claim 5, wherein the part of the UCI bits piggybacked in the configured grant resource are HARQ-ACK bits.

8. The method of claim 5, wherein the part of the UCI bits piggybacked in the configured grant resource are UCI bits of URLLC service.

9. A device comprising: a transceiver and a processor; wherein
the processor is configured to configure a parameter to indicate number of resource elements used for piggyback UCI bits in configured grant resource configured for PUSCH:
the transceiver is configured to transmit the parameter to the terminal, and when number of UCI bits to be piggybacked in the configured grant resource is larger than capacity of the number of the resource elements, the transceiver is further configured to receive a part of the UCI bits piggybacked on the number of resource elements indicated by the parameter, wherein remaining UCI bits are dropped; wherein the transceiver is further configured to:
transmit another parameter configured by the processor for indicating number of UCI bits that can be piggybacked in the configured resource, and receiving the part of the UCI bits in the configured grant resource piggybacked according to the another parameter.

10. The device of claim 9, wherein priority of the part of the UCI bits is higher than the remaining UCI bits.

11. The device of claim 9, wherein the part of the UCI bits piggybacked in the configured grant resource are HARQ-ACK bits.

12. The device of claim 9, wherein the part of the UCI bits piggybacked in the configured grant resource are UCI bits of URLLC service.

13. A method, comprising:
  configuring a parameter to indicate number of resource elements used for piggyback UCI bits in configured grant resource configured for PUSCH; and
  when number of UCI bits to be piggybacked in the configured grant resource is larger than capacity of the number of the resource elements, receive a part of the UCI bits piggybacked on the number of resource elements indicated by the parameter, wherein remaining UCI bits are dropped; wherein the method further comprises:
  configuring another parameter for indicating number of UCI bits that can be piggybacked in the configured resource and receiving the part of the UCI bits in the configured grant resource piggybacked according to the another parameter.

14. The method of claim 13, wherein priority of the part of the UCI bits is higher than the remaining UCI bits.

15. The method of claim 13, wherein the part of the UCI bits piggybacked in the configured grant resource are HARQ-ACK bits.

16. The method of claim 13, wherein the part of the UCI bits piggybacked in the configured grant resource are UCI bits of URLLC service.

* * * * *